United States Patent [19]

Reese

[11] 4,043,785

[45] Aug. 23, 1977

[54] SHAPING GLASS SHEETS

[75] Inventor: Thomas J. Reese, Sarver, Pa.

[73] Assignee: PPG Industries, Inc., Pittsburgh, Pa.

[21] Appl. No.: 714,067

[22] Filed: Aug. 13, 1976

[51] Int. Cl.² .......................................... C03B 23/02
[52] U.S. Cl. .................................... 65/107; 65/273;
                                             65/290; 65/291; 65/274
[58] Field of Search ................ 65/106, 107, 273, 275,
                                             65/290, 291, 274

[56]         References Cited
         U.S. PATENT DOCUMENTS

| 2,111,392 | 3/1938  | Galey ...................................... 65/273    |
| 2,176,999 | 10/1939 | Miller ................................. 65/287 X      |
| 2,215,228 | 9/1940  | Oliver ...................................... 65/107   |
| 2,999,338 | 9/1961  | Richardson ............................. 65/273        |
| 3,248,195 | 4/1966  | Golightly et al. ..................... 65/107           |
| 3,262,768 | 7/1966  | Carson .................................. 65/104        |
| 3,762,903 | 10/1973 | Hamilton et al. ....................... 65/107          |
| 3,762,904 | 10/1973 | Hamilton ................................ 65/107        |
| 3,795,501 | 3/1974  | Jannson et al. ........................ 65/106          |
| 3,795,570 | 3/1974  | Jansson et al. ......................... 428/34         |
| 3,847,586 | 11/1974 | Reese et al. ........................... 65/290         |
| 3,865,680 | 2/1975  | Reese et al. ........................... 428/174        |
| 3,879,184 | 4/1975  | Hamilton et al. ....................... 65/107          |
| 3,880,636 | 4/1975  | Tobin et al. ............................ 65/107        |

Primary Examiner—Arthur D. Kellogg
Attorney, Agent, or Firm—Dennis G. Millman; Edward I. Mates

[57]              ABSTRACT

Method and apparatus for shaping a glass sheet by the gravity sag bending process to include a sharp bend by a combination of overall heating and localized heating.

8 Claims, 5 Drawing Figures

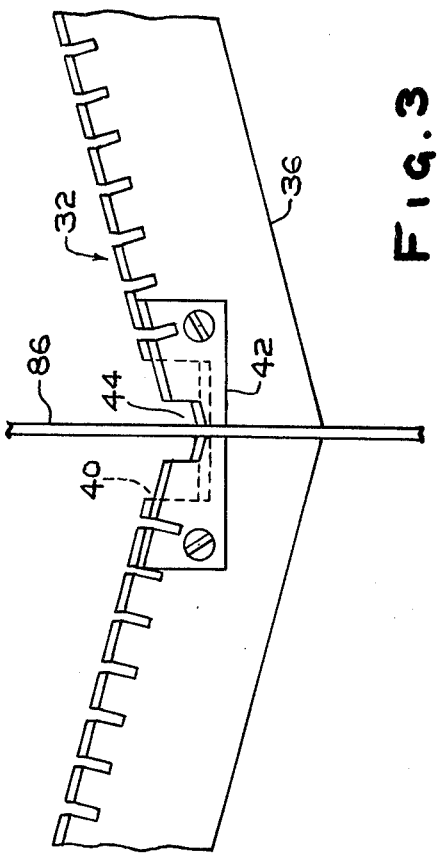
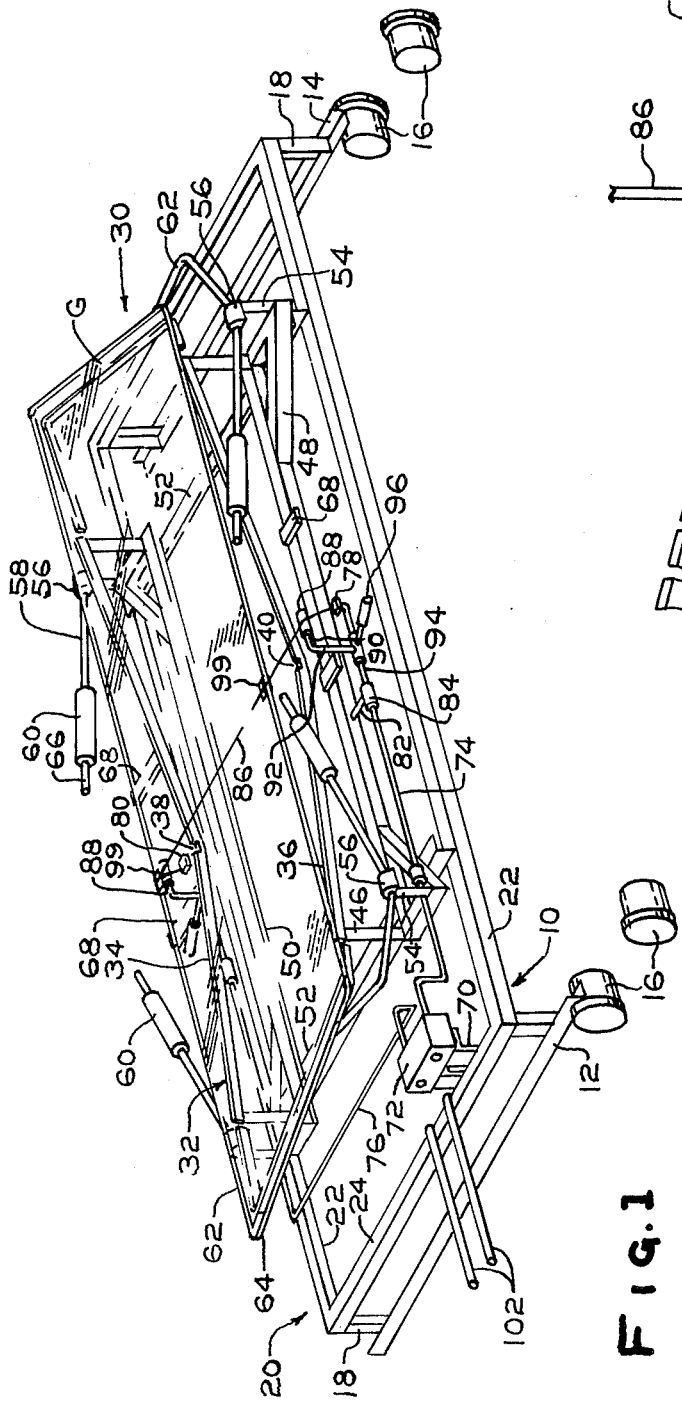

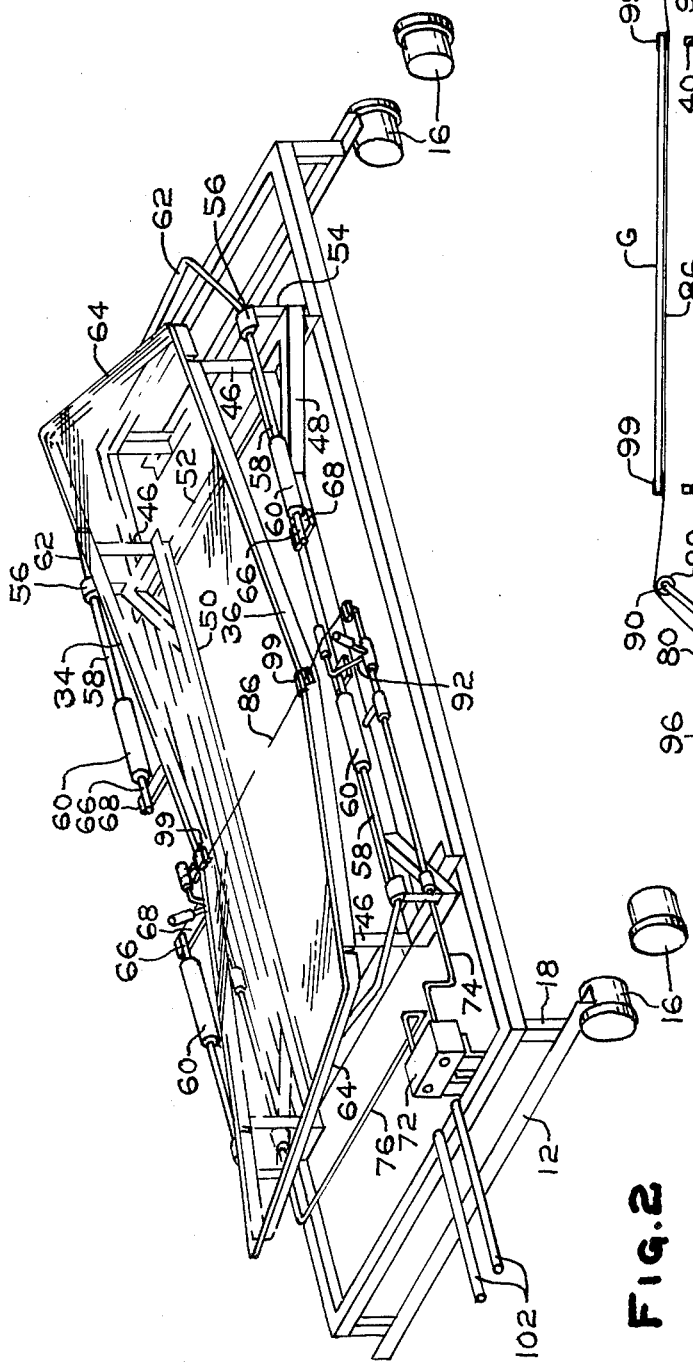
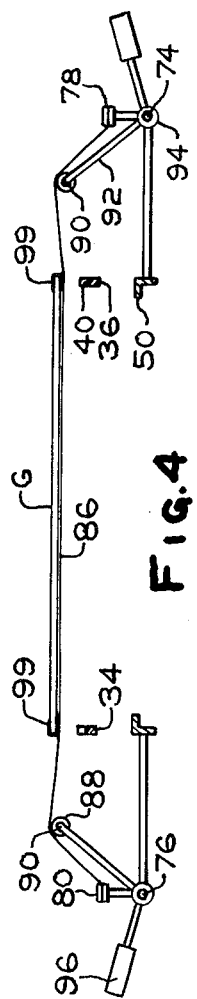
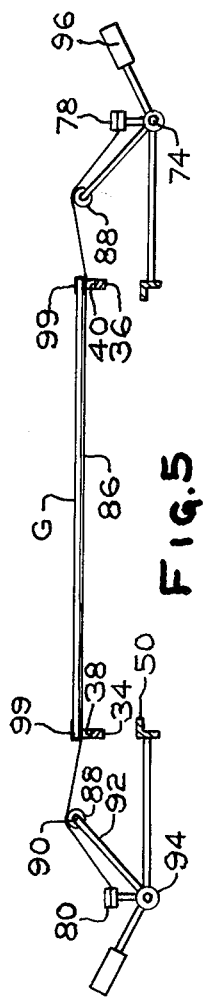

SHAPING GLASS SHEETS

BACKGROUND OF THE INVENTION

1. Field of the Invention

The present invention relates to shaping glass sheets, and particularly, refers to the shaping of glass sheets into complicated shapes incorporating a sharp line of bending extending completely across a dimension, more specifically the width, of the bent glass sheet. Such a line of bending provides a continuation of a line of sharp bending in the automobile body in which the bent glass is installed. Such bends satisfy the desires of automobile stylists to incorporate shaped glass sheets whose shapes conform to the shape of the automobile body in which the glass is mounted. Such bends are useful as windshields, back windows and roof windows of automobiles and other vehicles and may also be used in shaped windows in buildings.

2. Description of the Prior Art.

In recent years, several patents have issued relating to the bending of glass sheets to sharp curvatures. U.S. Pat. No. 3,762,903 to Harold E. Hamilton discloses the application of an elongated line of electroconductive frit of ceramic silver or other suitable electroconductive material in one or more layers along a line desired for sharp bending to one or more surfaces of one or more glass sheets to be shaped on an outline bending mold defining a V-shaped configuration desired for the bent glass. The glass sheet is initially heated to a temperature slightly below the glass softening point that is sufficient to fuse the frit along the line of sharp bending. Electrodes are held against the opposite ends of the electroconductive frit and voltage is impressed between the electrodes. The impressed voltage passes current through the frit, thereby heating the frit electrically. The electrically induced heat raises the glass temperature locally along the line desired for sharp bending. The glass sags rapidly along the line of sharp bending until it conforms to the shaping surface of the V-shaped outline mold. The frit remains as an opaque line extending across a dimension of the ultimate product because it is very difficult to remove a fused ceramic frit.

U.S. Pat. No. 3,762,904 to Harold E. Hamilton, Robert E. Bamford and Paul Pastorek discloses forming a groove in a glass surface along a line of sharp bending, applying a line of electroconductive frit that is fusible onto the glass either in the groove or aligned with the groove along the surface of the glass opposite the grooved surface. The electroconductive frit fuses to the glass to provide an opaque line in the finished product. Furthermore, while grooves accentuate the rate at which the glass sheet sags along the line of sharp bending, grooving weakens the glass and also enhances optical distortion. Therefore, grooving preferably should be avoided.

U.S. Pat. No. 3,879,184 to Harold E. Hamilton and Ivan L. Soreghy discloses a process for altering the residual strain remaining along the relatively sharp bend of a glass sheet resulting from the passage of an electric current through an elongated line of electroconductive material by interposing a strip of coloring agent between the glass sheet surface and the electroconductive material or line lengthwise of the line before applying the voltage that causes electrical heating of the glass along the line desired for sharp bending.

In each of the three patents enumerated thus far, the application of electrodes to the ends of the lines of electroconductive material causes problems in maintaining the sharp bend at the ends of the line of sharp bending. U.S. Pat. No. 3,865,680 to Thomas J. Reese and Harry S. Koontz discloses a technique where transverse extensions of the line of electroconductive frit are applied to extend in offset relation from the ends of the line of sharp bending to provide relatively large areas for electroconductive contact with the electrodes through which electrical power is applied. While this invention improves the sharpness of bend, particularly at the edges of the bent glass sheet, this technique also leaves the problem of removing frit from the bent glass sheet.

U.S. Pat. No. 3,795,501 to Robert A. Jansson and Thomas J. Reese, U.S. Pat. No. 3,795,570 to Robert A. Jansson and Dean L. Thomas and U.S. Pat. No. 3,847,586 to Thomas J. Reese, George R. Claassen and Melvin W. Tobin relate to method and apparatus for bending glass sheets into curvatures including a sharp bend using one or more narrow, elongated ribbons of electroconductive material which may be removed from the line of sharp bending after the glass is shaped. In each of the latter three patents, it is necessary to complicate the loading and unloading of the glass relative to the mold because of the need to apply and remove the narrow, elongated ribbon of electroconductive material relative to the glass in conjunction with loading or unloading the glass relative to the mold.

U.S. Pat. No. 2,111,392 to Henry J. Galey, U.S. Pat. No. 2,176,999 to Robert A. Miller, U.S. Pat. No. 2,215,228 to James G. Oliver and U.S. Pat. No. 3,248,195 to James S. Golightly and Harold E. McKelvey disclose the use of radiant heaters in glass sheet bending apparatus that apply sharp localized bends to a glass sheet along an enlongated axis thereof. However, these patents show apparatus that support the heaters in such positions that it is difficult to load or unload a glass sheet from the mold.

U.S. Pat. No. 2,999,338 to Ronald L. Richardson discloses a mold for bending glass sheets to compound curvatures. In this patented apparatus, electrical heating elements are carried by a pivotable overhead member which must be pivoted out of the way to load and unload a glass sheet relative to the mold. In addition, localized heaters are permanently installed within the outline end sections of a sectionalized mold. These localized electrical heaters are permanently mounted below the glass surface in the open or spread-apart position of the end mold sections of the sectionalized mold and the glass moves upward away from the localized electrical heaters as the glass is lifted while it is shaped.

SUMMARY OF THE INVENTION

The present invention provides a method and apparatus for shaping a glass sheet to a complicated shape including a sharply curved, crease-like shape extending across an entire dimension, namely, the width of the sheet. Apparatus for performing the method according to the present invention comprises an outline metal mold of the skeleton type including a pair of longitudinally extending shaping rail portions and a vertically movable electroconductive heating element in the form of a flexible metal ribbon supported between electrodes disposed beyond the shaping rail portions in a vertical plane that intersects the rail portions. The apparatus includes means to insulate the ribbon from the rail portions. In addition, means is provided to bias the ribbon toward the bottom surface of the glass sheet being shaped and means is provided on the glass edges to maintain the ribbon in spaced relation to said bottom surface a distance approximating the thickness of the spacing means as the glass sheet lowers toward the rail portions during heating. The upward biasing force is so small that the ribbon lowers in response to the sagging of the glass sheet toward the shaping surface of the outline mold. The heating ribbon is permanently mounted on the mold so that when the mold is not supporting a glass sheet, the ribbon is biased upward toward the position occupied by the flat glass sheet when the latter is mounted on the mold for shaping, but the upward force is so small that the ribbon is readily lowered when loading the mold with a glass sheet preparatory to bending.

According to the method of the present invention, a glass sheet to be bent is prepared for shaping by engaging opposed edge portions along the line of sharp bending with thin spacer members and the sheet so engaged is mounted on the upward facing surface of an outline mold of concave elevation, with a ribbon of unenergized electroconductive heating material biased upward into an upper position in closely spaced relation to the lower surface of the sheet. The mold and its supported glass sheet are heated by overall furnace heat to a temperature near the deformation temperature of the glass with the ribbon spaced from the glass sheet a minimum distance equal to the thickness of the spacer member. At the approximate time in the heating cycle that the sheet starts to sag toward the shaping surface of the mold, the elongated ribbon of electroconductive heating material is energized by applying voltage thereto, which causes it to radiate heat locally into the glass sheet along a line of sharp bending. This localized heat accelerates the sagging of the glass sheet along the line of sharp bending. The flexible electroconductive ribbon is lowered in closely spaced relation to the sagging glass sheet as the portion of the glass sheet to be bent sharply sags. Just before or at approximately the same time as the glass sheet conforms to the shaping surface of the mold, the voltage to the ribbon is stopped, the bend is completed by overall heating and the mold is removed from the heating area and transferred to a cooling area where the shaped glass is cooled at a rate sufficient to impart a desired degree of temper or anneal.

The outline mold of the skeleton type according to a specific embodiment of the present invention comprises an elongated metal rail disposed edgewise. The metal rail may be either a unitary or sectionalized rail and comprises a pair of longitudinally extending rail portion transversely spaced from one another and disposed along the length of the opposite sides of the mold. The upper edge of the rail forms a shaping surface conforming substantially to the shape desired a short distance inside of the outline of the glass sheet after bending and includes an elevational shape of said longitudinally extending rail portions that is V-shaped. The elongated ribbon of electroconductive material is supported between a first electrode located laterally outside of one longitudinally extending rail portion of the mold and a second electrode located laterally outside of the opposite longitudinally extending rail portion of the mold and along a transverse line of alignment with the first electrode. The transverse line of alignment between the electrodes lies in a transverse vertical plane that intersects the lowest portions of the V-shaped elevations of the transversely spaced longitudinally extending rail portions.

In order to prevent electrical energization of the mold in case the current in the ribbon is not discontinued in time, means is provided to insulate the rail portions from the ribbon. To accomplish this object, each of the longitudinally extending rail portions is covered with an insulator material in its portion of lowest elevation aligned with the transverse line of alignment extending between the electrodes. The insulator material is preferably a notched insert of dielectric material attached to a notched portion of each longitudinally extending rail portion. Thus, the energized ribbon of electroconductive material is maintained in electrical insulation from the metal mold rail throughout the bending operation and in closely spaced relation to the glass sheet area to be bent sharply throughout the portion of the bending cycle during which said area is exposed to intensive localized heating.

These and other features of the present invention will become obvious in the light of a description of an embodiment of glass sheet bending mold used to prove the feasibility of bending glass sheets to a V-shaped according to the present invention which follows.

BRIEF DESCRIPTION OF THE DRAWINGS

In the drawings which form part of the description and where like reference numbers refer to like structural elements:

FIG. 1 is a perspective view of a glass sheet bending mold conforming to the present invention in the open mold position with a flat glass sheet mounted thereon for bending;

FIG. 2 is a view similar to FIG. 1 showing the mold in its closed position supporting the glass sheet after the latter has been shaped to a desired shape;

FIG. 3 is a front enlarged perspective view of a portion of an embodiment of the present invention that is used for bending and tempering glass sheets;

FIG. 4 is a fragmentary, schematic sectional view of a mold portion according to the present invention showing how a ribbon is arranged below a supported glass sheet relative to a pair of electrodes, a pair of elongated shaping rails and ribbon tensioning means when a flat glass sheet is mounted on a mold; and FIG. 5 is a view similar to FIG. 4 showing the portion of the mold with the bent glass sheet mounted thereon and showing where the positions of the electrodes, shaping rails, ribbon and ribbon tensioning means are relative to one another after the glass sheet bending is completed.

DESCRIPTION OF THE PREFERRED EMBODIMENTS

Referring to the drawing, FIG. 1 shows a mold supporting carriage 10 provided with a pair of end rails 12 and 14 adapted to ride on rotating stub rolls 16 of a conveyor which conveys the mold supporting carriage 10 and an outline mold 30 (to be described later) supported thereon through a tunnel-type heating area through which glass sheets are conveyed in succession to be heated to their deformation temperature until they sag by gravity to conform to the mold. The furnace is provided with heaters in the usual manner and the present description thereof omits a showing of the furnace because such furnaces are well known in the prior art and the details thereof form no part of the present invention.

The mold supporting carriage 10 also includes a series of vertical posts 18, connected at their lower end to the end rails 12 or 14 and at their upper ends to the corners of a frame 20 comprising longitudinal frame members 22 and transverse frame members 24 which are interconnected to one another to form said corners. In this manner, the frame 20 is supported in vertically spaced relation above the end rails 12 and 14.

The mold 30 mentioned previously for bending a glass sheet to a V-shaped according to the present invention is of generally outline shape and comprises an elongated metal rail disposed edgewise and having its upper edge forming a shaping surface 32 conforming substantially in outline and elevation to the shape desired for the glass sheet after bending. For molds used to support a glass sheet for bending and tempering, the shaping rail is preferably made of stainless steel 1.5 inches (4 centimeters) wide and of tapered thickness ranging from a maximum of ⅛ inch (3 millimeters) at its lower edge to about 1/32 inch (0.8 millimeter) at its upper edge. For bending and tempering molds, the upper edge 32 is serrated as shown in FIG. 3 as is conventional to provide clearance for the passage of cool air streams that are directed against the opposite major surfaces of the bent glass to impart a temper in the glass sheet after the latter is shaped to conform to the mold shaping surface and delivered to a quenching area where the opposite surfaces of the glass are quenched while still supported on the outline mold. A bending and tempering mold is supported by a reinforcing frame that surrounds the shaping rail and is of approximately the same elevational configuration as that of the shaping rail of the mold to permit ready passage of the bending and tempering mold through a shaped quenching station comprising opposed sets of nozzles through which air is blasted against the opposite surfaces of the shaped glass in a manner well known in the art.

In either a bending mold or a bending and tempering mold, the shaping rail includes a pair of longitudinally extending rail portions 34 and 36 that are transversely spaced from one another. The longitudinally extending rail portions 34 and 36 each have a V-shape in elevation and include respective notched-out portions 38 and 40 at their lowest portions (FIGS. 4 and 5). The latter are aligned with one another along a transverse vertical plane of alignment. A notched member 42 of electrical insulation material, such as mica or an insulating sheet material sold under the trademark TRANSITE, is fixed to each rail portion 34 and 36 in position to partly fill the respective notched portion 38 or 40. The notched member 42 has a notched portion 44 smaller than the notched-out portion 38 or 40 in the rail portion 34 or 36 and the notched portion 44 is arranged symmetrically in spaced relation to the notched portion 38 or 40 in the rail portion 34 or 36 so as to leave sufficient space within the boundary of the notched portion 38 or 40 for purposes to be explained later. The notched portions 44 are thus aligned with one another along the transverse vertical plane that intersects the line of sharp bending desired for the shaped glass.

Each rail portion 34 and 36 is rigidly supported at each end portion thereof on a vertical post 46. Each of the latter extends downward from its uppermost point of connection to the end of one of the rail portions 34 and 36 to a triangularly shaped bracing member 48 disposed at each of the four corners of a mold reinforcing frame comprising longitudinally extending frame members 50 interconnected by transversely extending frame members 52.

The mold support carriage 10 supports the mold 30 by having the transversely extending frame members 52 rest at their opposite ends on the opposite longitudinal frame members 22. In this manner, a complement of mold supporting carriages 10 can be used to support bending molds 30 for different production patterns without requiring a change of mold support carriage.

A vertical bar member 54 is attached at its lower end to the laterally outward portion of each bracing member 48 and extends upward therefrom. A bearing housing 56 is carried at the upper portion of each vertical bar member 54. A lever arm 58 provided with a weight 60 extends longitudinally inward of each bearing housing 56 and an outrigger 62 extends longitudinally outward and transversely inward from each bearing housing 56 to a rigid connection with an end rail portion 64 in spaced relation below the upper edge thereof. Each end rail portion comprises a shaping rail that has an outline shape of a modified C or U in plan and an elevational shape along its upper edge surface that forms a continuation of the shaping surfaces 32 of longitudinally extending rail portions 34 and 36 in the closed mold position of FIG. 2. In the illustrated embodiment, there are two end rail portions 64, each located beyond a transversely opposed pair of end portions of longitudinally extending rail portions 34 and 36.

The bearing housings 56 are arranged in pairs of transversely spaced bearing housings, one pair for each of the end rail portions 64, to permit the latter to pivot with said outriggers 62 and lever arms 58 between a spread-apart position, such as depicted in FIG. 1 for supporting a flat glass sheet G for bending, and a closed mold position, depicted in FIG. 2, wherein the end rail portions 64 form continuations of the longitudinally extending rail portions 34 and 36 to produce a substantially continuous shaping frame conforming in elevation and outline plan to the shape desired along a line just inside the outline of the glass sheet G after bending.

In order to insure that the end sections close in proper alignment and orientation with respect to the longitudinally extending rail portions 34 and 36, each lever arm 58 is provided with an inner extension 66 that pivots with the lever arm 58 into contact with a stop member 68. Four stop members 68 are included, one for each lever arm. The stop members are located in the paths of movement of each associated inner extension 66 and are connected to any convenient connection such as the longitudinally extending frame members 50. The vertical position of the upper surface of each stop member 68 is such that when the inner extension 66 of its associated weighted lever arm 58 pivots downward about the bearing housing 56 to engage the associated stop member, the end rail portions 64 are in proper alignment and orientation with respect to the ends of the longitudinally extending rail portions 34 and 36.

It is understood that the present invention is also applicable for use with a continuous mold in which the end mold portions 64 are rigidly attached to the longitudinally extending rail portions 34 and 36. Generally, such continuous molds are preferred when the shape of the glass sheet to either side of the line of sharp bending is essentially flat and when the maximum amount of drop from the flat glass to the lowest portion of the V-shaped is relatively small, namely, less than about 3 inches (7.6 centimeters).

One of the transverse frame members 24 supports a bracket 70 on which is mounted an electrode box 72. A rigid wire conductor 74 extends from the electrode box 72 to a first electrode 78 laterally outside rail portion 36 and another rigid wire conductor 76 extends from electrode box 72 to a second electrode 80 laterally outside rail portion 34. The electrodes 78 and 80 are located along the transverse vertical plane of alignment intersecting the lowest portions of rail portions 34 and 36. Along the length of the conductors 74 and 76, suitable spacers 82 and insulators 84 are provided to maintain the conductors 74 and 76 in spaced relation and insulated from the grounded metal structure of the carriage 10 and of the mold 30.

A flexible elongated ribbon of electroconductive material 86, preferably a nichrome ribbon 3 mils (0.08 millimeter) thick and ⅛ inch (3 millimeters) wide has its ends connected to electrodes 78 and 80 in such a fashion that its length is longer than the straight line distance between the electrodes. The ribbon 86 extends at one end from electrode 78 obliquely upward so that its lower surface extends over a first spool 88 outside said rail portion 36 and its other end extends from electrode 80 obliquely upward over a second spool 88 outside rail portion 34. The intermediate portion of the ribbon 86 extends across the width of the mold 30 between the spools 88 in the transverse vertical plane of alignment mentioned hereinbefore. The spools 88 are circumferentially grooved in said transverse vertical plane of alignment to define the line along which the ribbon 86 extends across the mold.

The spools 88 are freely rotatably about a longitudinally extending pivot pin 90. The latter is an extension of a radial pin 92 which in turn is mounted on a sleeve 94 in insulated relation to a wire conductor 74 or 76. A weighted arm 96 extends laterally outward from the sleeve 94 to provide an upward biasing force for one of the spools 88 and a similar construction is found on the other side of the mold for the opposite spool.

The length of the flexible ribbon 86 is longer than the straight line distance between electrodes 78 and 80 but is only of limited length to limit the upward movement of the spools 88 connected to the weighted arms 96. The ribbon stretches across the width of the mold at an elevation just below the plane occupied by the lower major surface of the flat glass sheet mounted on the mold.

A spacer element 99 is folded around each edge of the glass in the location which would normally be engaged by the ribbon 86 so as to space the ribbon from the bottom surface of the glass by a distance approximating the thickness of the spacer element 99. Preferred materials for the spacer element are a graphite tape 10 to 20 mils (¼ to ½ millimeter) thick and non-conductive tapes, such as asbestos, fiber glass and other refractory tape-like compositions containing silica such as those sold under the trademark FIBERFRAX. The force applied to the ribbon 86 by the weighted arm 96 is such that the ribbon is maintained essentially straight or with a barely perceptible sag between the supporting spools 88 and is considerably less than the mass of a glass sheet mounted on the mold for bending.

A pair of electrical power terminals 102 are provided to engage plugs in the electrode box 72. The terminals are connected to a source of voltage (not shown) through connections (not shown) that are normally carried on a sidewall of the tunnel-type bending lehr. While the manner by which the electrical power terminal connectors 102 are connected to the voltage source is not shown, the present apparatus can use any manner by which such connectors are electrically coupled to a voltage source through elements carried by a wall of the bending furnace as is well known in the art as evidenced by U.S. Pat. No. 3,248,195 to Golightly and McKelvey. Furthermore, the manner of connecting the voltage source electrodes to the electrodes carried by the mold structure is not part of the present invention.

Examples

Apparatus constructed according to the present invention was operated as follows. A sheet of glass G 7/32 inch (5.5 millimeters) thick which is unbent was mounted on the upper shaping surface of the mold 30 so that its outermost edge portions rested on the outer corners formed by the C-shaped end rail portions 64 and intermediate its extremities, the glass sheet G was supported on the ends of the longitudinally extending rail portions 34 and 36. The flexible, electroconductive ribbon 86 was permanently disposed between electrodes 78 and 80 and over the spools 88. In the absence of any downward force on the ribbon 86, the weighted arms 96 pivoted the spools 88 into the uppermost position permitted by the length of the ribbon extending between electrodes 78 and 80.

Spacer elements of carbon tape 99 were previously provided along the edges of the glass in the portion to be aligned with the ribbon 86 when the glass was loaded. The ribbon 86 was thus tensioned against the bits of carbon tape 99 which surrounded the side edge portions of the glass sheet G so that the portion of the ribbon 86 extending between its portions engaging the carbon tape 99 was separated from the bottom surface of the glass by a distance approximating the thickness of the carbon tape 99. This thickness was approximately 10 mils (¼ millimeter).

The glass-laden mold was then introduced into a staged bending furnace and the glass and mold were heated for 3 minutes in a single stage furnace temperature having a roof thermocouple reading 1080° F. (580° C.). After two minutes of said overall heating, a voltage of 86 volts was applied across the electrodes 78 and 80 to develop in the ribbon 86 a current of 14 amperes for 72 seconds. The glass-laden mold was removed from the heated furnace after 13 more seconds of exposure to the furnace heat with no current supplied to the ribbon. A good V-bend resulted with no bead on the concave surface and a slight groove on the convex surface.

After the heating was applied locally along the length of the ribbon 86, the glass sagged rapidly along a line immediately above the ribbon to provide a sharp V-bend. In addition, the weights 60 caused the end rail portions 64 to pivot upward and caused the longitudinal end portions of the glass sheet to develop the shape of the upper shaping surface of the mold. The glass sheet so produced has a sharp V-bend extending across the central portion of the sheet and symmetrical gradual bends at its longitudinal extremities.

In another successful experiment, a nichrome ribbon ¼ inch (6 millimeters) wide and 3 mils (0.08 millimeter) thick was used on a mold in a multi-stage furnace where the successive stages were set for 1040° F. (560° C.), 1180° F. (640° C.), 1100° F. (590° C.) and 800° F. (430° C.). The length of the second stage was 7 feet (2.1 meters), the third stage was 7.25 feet (2.2 meters) and the fourth stage was 25 feet long (7.6 meters).

A glass sheet having a nominal thickness of 7/32 inch (5.5 millimeters) was bent according to the following cycle by keeping it in the first stage without ribbon heat for 450 seconds, then applying additional first stage heat plus ribbon heat for 100 seconds at a ribbon voltage of 47 volts which caused a current through ribbon of 20 amperes. The current was discontinued and the exposure to furnace heat continued for 80 seconds. Then, the mold passed through the heated second and third stages of the furnace at a speed of 10 feet (3 meters) per minute and was accelerated to pass into the fourth stage at a speed of 20 feet (6 meters) per minute and then slowed to 20 inches (0.5 meters) per minute to remain in the fourth stage a total of 9 minutes. A double thickness tape was used for the spacer elements in this successful experiment.

Other experiments were unsuccessful when too great a weight was used for the counterweights pivoting the ribbon upward and when the spools were disposed higher than the plane of support of the flat glass sheet over the central section shaping rails. Under such circumstances, the nichrome ribbon dug into the edges of the glass sheet even though the spacer elements in the form of tapes were applied.

When it is desired to temper the glass, the bent glass sheet is removed from a bending furnace and into a quenching station disposed just beyond the exit of the bending furnace. The upper and lower surfaces of the bent glass are chilled rapidly by exposure to blasts of air emanating from nozzles disposed in configurations parallel to the shape of the upper and lower surfaces of the glass in the quenching station.

Various modifications are possible within the spirit of the present invention. For example, the outline mold may be composed of a continuous rail having the desired V-shape in elevation and conforming in plan to the outline of the glass sheets to be shaped, insulating material such as fiber glass cloth may be wrapped around the central portion of the longitudinally extending rail portions 34 and 36 to provide means to insulate the ribbon from the mold rail portions when the latter is lowered and in this manner, electrically insulate the ribbon 86 from the rail portions. Furthermore, the heating element may comprise more than one layer of ribbon which is spot welded together at approximately 1½ inch centers (4 centimeters).

The form of the invention shown and described in this specification represents an illustrative preferred embodiment and certain modifications thereof. It is understood that various changes may be made without departing from the gist of the invention as defined by the claimed subject matter that follows.

I claim:

1. Apparatus for shaping a flat glass sheet to a shape including a line of sharp curvature extending from one side edge to the other side edge of said sheet, said apparatus comprising an outline mold of the skeleton type comprising an elongated metal rail disposed edgewise and having its upper edge forming a shaping surface conforming substantially to the shape desired for said glass sheet after bending, said rail including a pair of transversely spaced, longitudinally extending rail portions, each defining a generally V-shaped surface in elevation, the lowest portion of one of said V-shaped surfaces being aligned with the lowest portion of the other of said V-shaped surfaces along a transverse vertical plane of alignment, a first electrode located laterally outward of one side of said mold along said transverse plane of alignment and electrically insulated from said metal rail, a second electrode located laterally outward of the opposite side of said mold along said transverse plane of alignment, means adapted to couple said electrodes to a source of potential difference, a flexible electroconductive ribbon interconnected between said electrodes and extending therebetween along said transverse vertical plane of alignment, means disposed between at least one of said electrodes and said mold for engaging the undersurface of said ribbon and for urging said ribbon toward an upper position in said transverse vertical plane of alignment along a line below and adjacent to the plane occupied by the lower major surface of said flat glass sheet when the latter is mounted on said mold for bending, spacer means between the lower glass surface and said ribbon to limit said upper position to one spaced closely below said lower glass surface, said urging means providing an upward biasing force less than the mass of said glass sheet whereby said ribbon is urged to move to said upper position when a flat glass sheet is mounted on said mold and said ribbon moves to a lower position below the lowest portion of said shaping surfaces when said glass sheet sags to conform to said shaping surface, and means to insulate said ribbon from said metal rail.

2. Apparatus as in claim 1, wherein said means for limiting said upward position comprises spacing means engaging the opposite edges of said glass sheet along said transverse vertical plane of alignment to space said ribbon from said glass sheet a distance approximating the thickness of said spacing means.

3. Apparatus as in claim 1, wherein said ribbon engaging means comprises a pair of ribbon engaging members movable in said transverse vertical plane, one of said members being disposed between one of said electrodes and one of said longitudinally extending rail portions and the other of said members being disposed between the other of said electrodes and the other of said longitudinally extending rail portions, and a pair of urging members, one operatively connected to one of said ribbon engaging members and the other operatively connected to the other of said ribbon engaging members.

4. Apparatus as in claim 3 wherein said longitudinally extending rail portions are notched to space said ribbon from direct contact with said rail portions.

5. Apparatus as in claim 4 wherein electrical insulation material is carried by said longitudinally extending notched rail portions in position to be interposed between said ribbon and said longitudinally extending rail portions.

6. A method of shaping a flat glass sheet to a shape including a line of sharp bending extending completely across a dimension of said sheet comprising supporting said sheet over an outline shaping surface of a mold of the gravity sag type free of any overhead heating elements, applying spacing means to edge portions of the lower major surface of the sheet at opposite ends of the line of sharp bending, urging a ribbon of electroconductive material into close proximity to the lower major surface of said supported flat glass sheet along a line extending transversely of said supported sheet in a transverse vertical plane that intersects said line of sharp bending, heating said sheet over its entire area to a temperature approximating its deformation temperature, intensifying the heating of said ribbon when said sheet begins to sag, thereby intensifying the heating of said glass sheet along said transversely extending line of sharp bending and accelerating the sagging of said glass sheet along said transversely extending line, lowering said ribbon in closely spaced relation to said lower major surface as said glass sheet sags while maintaining an upward bias on said ribbon so that said ribbon contacts said spacing means and said spaced relation is maintained by said spacing means, discontinuing the intensified heating of said ribbon while continuing to heat said sheet over its entire area until the sagging of said glass sheet onto said outline shaping surface is completed.

7. A method as in claim 6, wherein said bent glass sheet is cooled sufficiently rapidly while mounted on said mold and immediately after said sagging is completed to impart a desired degree of temper thereto.

8. A method as in claim 6, wherein said ribbon is heated by applying electric current therethrough.

* * * * *